(12) United States Patent
Sakurai

(10) Patent No.: US 6,770,999 B2
(45) Date of Patent: Aug. 3, 2004

(54) STATOR OF VEHICLE AC GENERATOR

(75) Inventor: Mikiya Sakurai, Ama-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/366,353

(22) Filed: Feb. 14, 2003

(65) Prior Publication Data

US 2003/0164656 A1 Sep. 4, 2003

(30) Foreign Application Priority Data

Mar. 1, 2002 (JP) .................................. 2002-055814

(51) Int. Cl.⁷ ............................................. H02K 17/00
(52) U.S. Cl. ...................................... 310/208; 310/201
(58) Field of Search .................................. 310/179–208

(56) References Cited

U.S. PATENT DOCUMENTS 6,181,043 B1 * 1/2001 Kusase et al. ............... 310/201
6,201,332 B1 * 3/2001 Umeda et al. ............... 310/184
6,441,527 B1 * 8/2002 Taji et al. .................... 310/201
6,476,530 B1   11/2002 Nakamura et al. .......... 310/201

FOREIGN PATENT DOCUMENTS

GB        2 202 170 A    9/1988

* cited by examiner

Primary Examiner—Dang Le
(74) Attorney, Agent, or Firm—Oliff & Berridge, PLC

(57) ABSTRACT

In a stator of a vehicle ac generator, a stator core has plurality of slots, each of which has a rectangular cross-section and a stator winding formed of a plurality of U-shaped conductor segments made of a round wire. Each of U-shaped conductor segment has a U-shaped turn portion disposed outside the slots at an end of the stator core, a pair of in-slot portions extending from the turn portion and disposed in a pair of the slots and a pair of connection portions respectively welded to connection portions of other two U-shaped conductor segments. Only the in-slot portions are press-formed to have an approximately rectangular cross section fitted to the slots.

7 Claims, 4 Drawing Sheets

STATOR OF VEHICLE AC GENERATOR

CROSS REFERENCE TO RELATED APPLICATION

The present application is based on and claims priority from Japanese Patent Application 2002-55814, filed Mar. 1, 2002, the contents of which are incorporated herein by reference.

BACKGROUND OF THE INVENTION

1. Field of the Invention

The present invention relates to a stator of an ac generator for a vehicle such as a truck, a passenger car or the like.

2. Description of the Related Art

As the idling speed of vehicles is reduced recently to reduce fuel consumption, the rotation speed of vehicle ac generators is also lowered. On the other hand, the output power of the vehicle generators has to be increased in order to operate various vehicle safety devices.

It is well known that the output power of a vehicle ac generator can be increased if the space factor of a stator winding to stator core's slots is increased, which reduces the resistance of the stator winding. The space factor can be increased if the conductors or wires of the stator winding inserted in the slots are fitted to the slots.

For example, JP-A63-194543 or its counterpart application GB 2202170A discloses a stator in which portions of a coiled round wire to be inserted into slots are press-formed to have an approximately rectangular cross-section to be fitted to the slots. However, it is difficult for each layer of the press-formed wire to have a uniform cross-section and a sufficiently large space factor because a plurality of layers of the round wire is press-formed all together.

JP-A-2000-299949 or its counterpart patent U.S. Pat. No. 6,476,530 B1 discloses a stator in which U-shaped conductor segments are inserted into slots. Each conductor segments is press-formed from a round wire to have portions that have an approximately rectangular cross section except the U-shaped turn portion. However, the press-formed portions of the U-shaped conductor segments that are disposed outside the slots may receive damage during operation under a severe environmental condition.

SUMMARY OF THE INVENTION

It is a main object of the invention to provide a compact and powerful vehicle ac generator that is resistant to various environmental conditions.

According to a feature of the invention, a stator of a vehicle ac generator includes a stator core having a plurality of slots and a stator winding formed of a plurality of U-shaped conductor segments made of a wire. Each of the slots has a rectangular cross-section, and each of the U-shaped conductor segments has a U-shaped turn portion disposed outside the slots at an end of the stator core, a pair of in-slot portions extending from the turn portion and disposed in a pair of the slots and a pair of connection portions respectively welded to connection portions of other two U-shaped conductor segments. Specifically, only the in-slot portions have a press-formed approximately rectangular cross-section fitted to the slots.

Because only the in-slot portions are pressed formed, the insulation film that covers all the portions of conductor segments outside the slots are not deformed or damaged even under a sever environmental condition.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
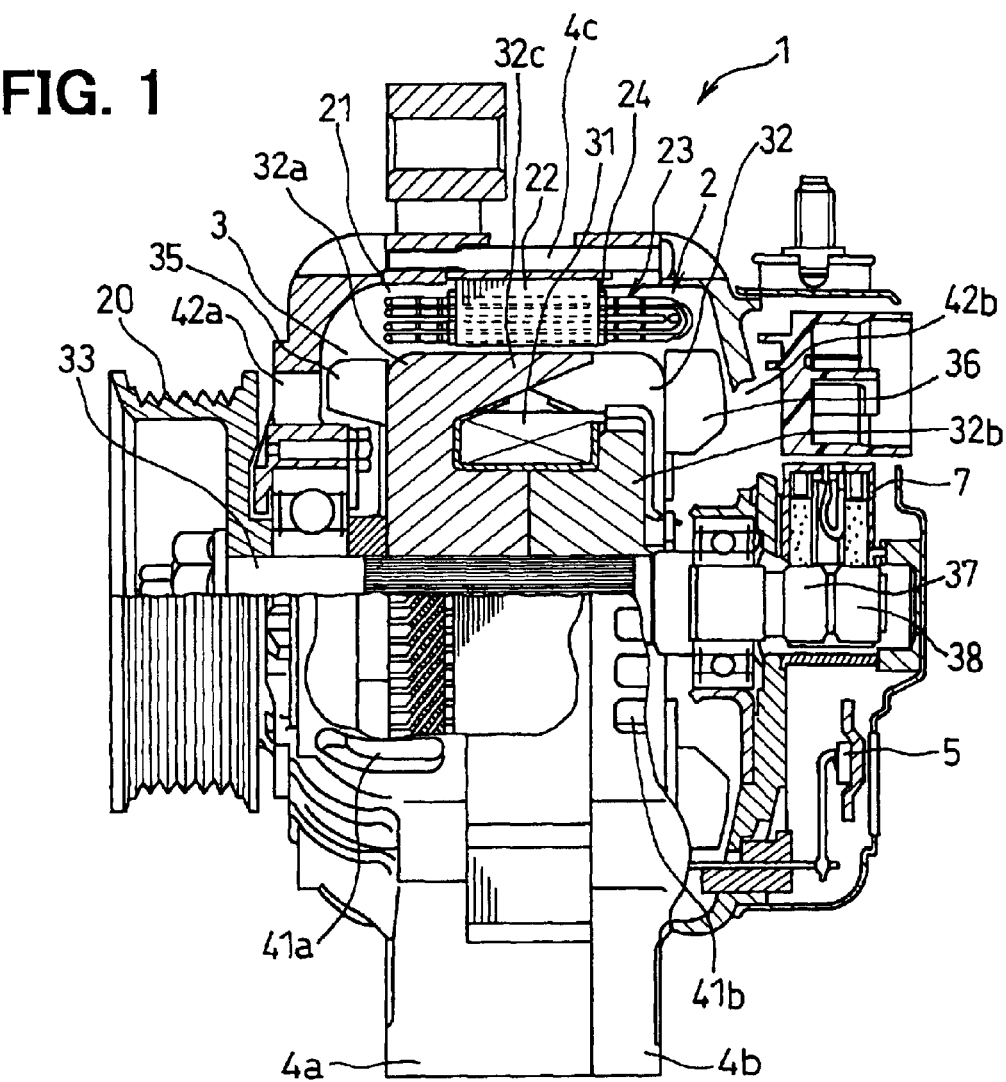
FIG. 1 is a cross-sectional side view of a vehicle ac generator that includes a stator according to a preferred embodiment of the invention.

A stator according to a preferred embodiment of the invention will be described with reference to the appended drawings.

An ac generator 1 includes a stator 2, a rotor 3, a pair of front housing 4a and a rear housing 4b that is connected by a plurality of bolts 4c, a rectifier unit 5 and others. The stator 2 includes a stator core 22, a multi-phase (e.g. three-phase) stator winding 21 that includes a plurality of U-shaped conductor segments 23 and insulators 24 for insulating the stator winding 21 from the stator core 22. The stator 2 is sandwiched between and supported by the front housing 4a and the rear housings 4b so as to be disposed around the rotor 3 at a certain gap.

The rotor 3 rotates together with a shaft 33 that is rotatably supported by the front housing 4a and the rear housing 4b. The rotor 3 includes a field coil 31 and a pole core unit 32. The pole core unit 32 includes a pair of front pole core 32a and a rear pole core 32b that is force-fitted to the shaft 33. Each of the pole cores 32a, 32b has six claw poles 32c extending in the axial directions toward another to hold the field coil 31 therein. A pulley 20 is fixed to the front end of the shaft 33 to be driven by an engine via a belt, which is not shown here.

A plurality of air intake windows 42a and 42b are respectively formed at the axial ends of the front housing 4a and the rear housing 4b. A mixed flow type cooling fan 35 is fixed to the front end of the front pole core 32a by welding or the like to take air from the air intake windows 42a in the inside of the housings 4a, 4b and send it in both axial and radial directions of the generator. A centrifugal cooling fan is fixed to the rear end of the rear pole core 32b in the same manner as the mixed flow type cooling fan to take air from the air intake windows 42b in the inside of the housings 4a, 4b and send it in radial directions. The front housing 4a and the rear housing 4b respectively have a plurality of air discharge windows 41a and 41b at portions opposite the coil ends of the stator winding 21.

Slip rings 37 and 38 are fixed to a rear portion of the shaft 33 and respectively connected to opposite ends of the field coil 31. Field current is supplied to the field coil 31 from a brush unit 7 via the slip rings 37, 38.

The rotor 3 of the above described vehicle ac generator 1 is rotated by an engine via the pulley 20. When field current is supplied to the field coil 31 from the brush unit 7 via the slip rings 37, 38, the respective claw-shaped poles 32c of the pole core 32a and the pole cores 32b are alternately polarized into N and S in the circumferential direction. Therefore, three-phase ac voltage is generated in the stator winding 21, and dc power can be provided at output terminals of the rectifier unit 5.

Figure 2:
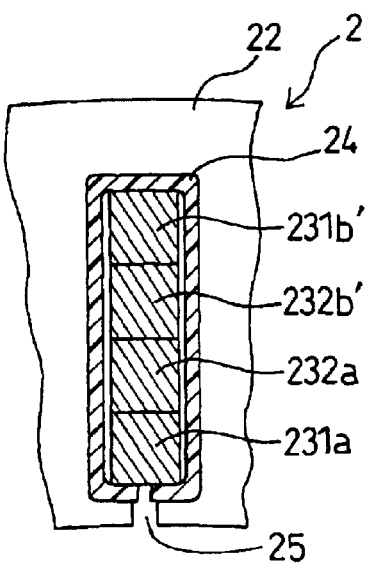
FIG. 2 is a fragmentary cross-sectional view of the stator.

The stator core 22 has a plurality of (e.g. 36) slots 25 for accommodating the stator winding 21 formed in the circumferential direction at equal intervals. Each slot 25 has an approximately rectangular cross-section so that radially aligned layers of conductors (herein after referred to as in-slot portions) can be snugly fitted to the inside walls of the slot 25, as shown in FIG. 2.

Figure 3:
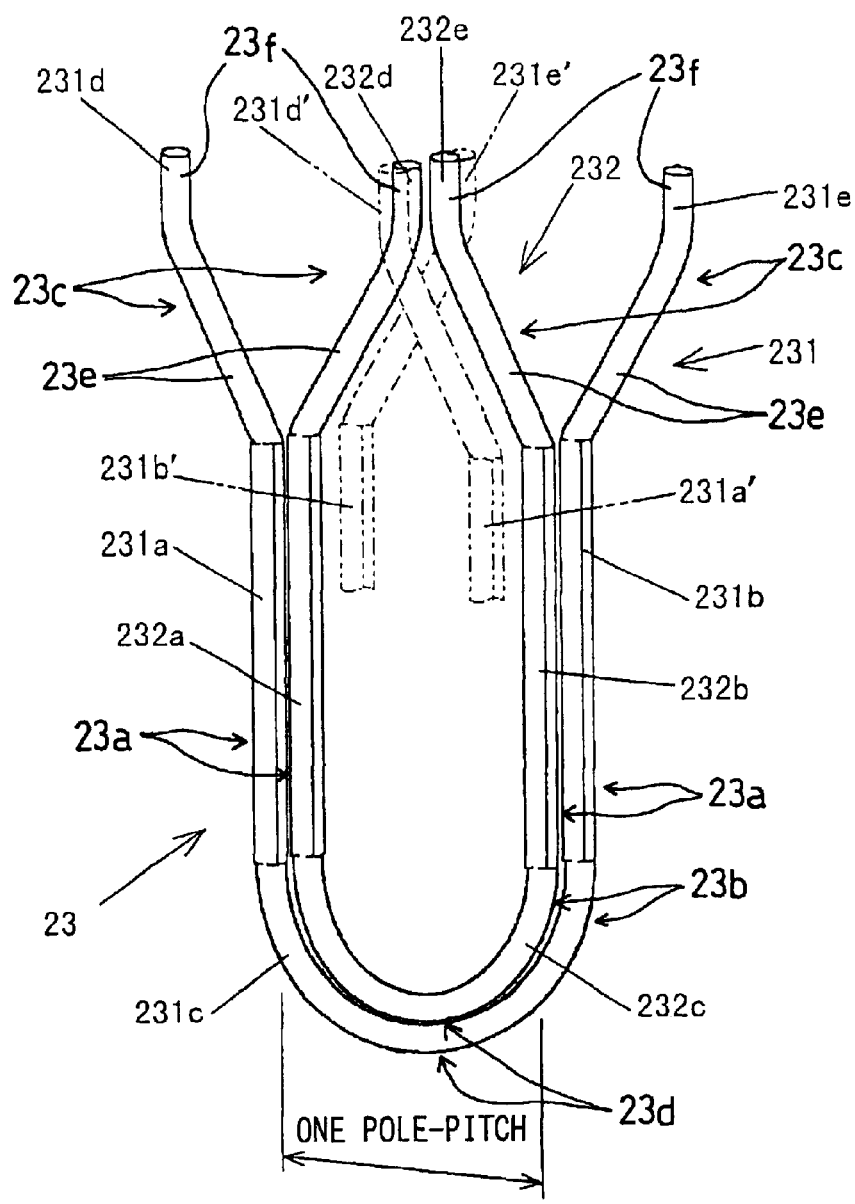
FIG. 3 is a perspective view of a pair of U-shaped round wire segments.
Figure 5:
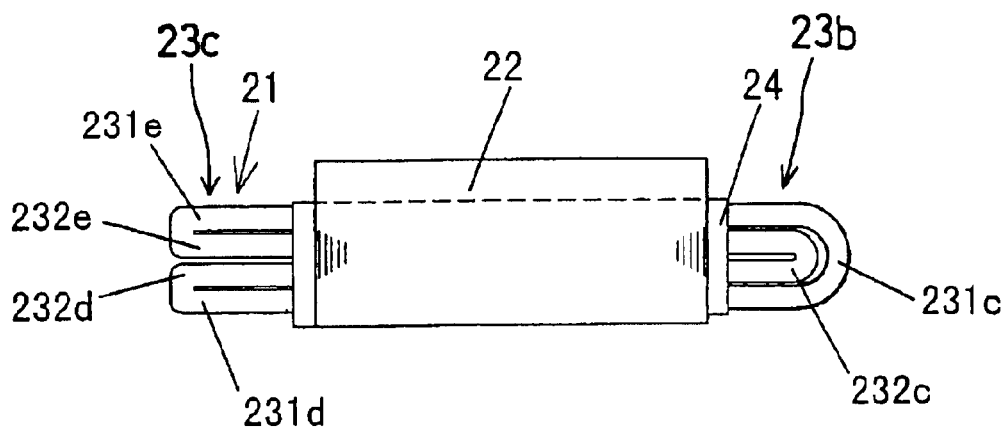
FIG. 5 is a fragmentary cross-sectional view of the stator illustrating coil-ends.

The stator winding 21 is formed of a plurality of conductor segments 23 that have connection ends 23f welded to one another. The conductor segments 23 are covered with insulation film. Each conductor segment 23 is made of a round wire and has a pair of in-slot portions 23a, 23a that are to be inserted into a pair of the slots 25, a turn portion 23b that integrally connects the pair of in-slot portions 23a, 23a and is to be disposed at the rear end of the stator core 22 and a pair of connection portions 23c, 23c that respectively extend from the in-slot portions 23a, 23a, as shown in FIG. 3 and FIG. 5. Cooling air which is driven by the cooling fans 35, 36 mainly flows through gaps formed between the connection portions 23c and gaps between the turn portions 23b.

The turn portion 23b has a turning point 23d at the middle thereof, as shown in FIG. 3. On the other hand, the connection portion 23c has an inclined portion 23e and a connection end 23f.

The in-slot portion 23a has an approximately rectangular cross-section that has opposite sides being fitted to the inside walls of the slot 25. On the other hand, the turn portions 23b and the connection portions 23c have an original round cross-section of the round wire. Therefore, the turn portions 23b and the connection portions 23c, which includes the inclined portion 23e and the connection end 23f, are formed only by bending when the conductor segment 23 is formed.

As shown in FIG. 2, four or another even number of in-slot portions 23a are aligned in a radial direction in layers and inserted in each slot 25. The in-slot portions 23a in one of the slots 25 form one of phase coils, which forms the multi-phase stator winding 21.

The conductor segments 23 are connected by a welder, such as an ultrasonic welder or an arc welder, at the connection ends 23f to one another in a prescribed pattern to form the stator winding 21.

Figure 4:
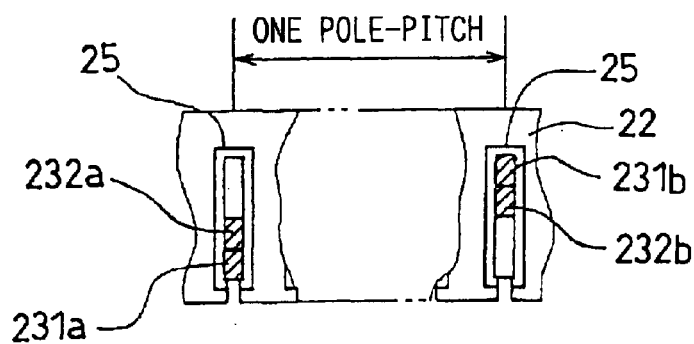
FIG. 4 is a fragmentary cross-sectional view of a portion of the stator having slots in which in-slot portions of conductor segments are inserted.

One of the in-slot portions 23a of a U-shaped conductor segment 23 disposed in a first one of the slots 25 is paired with another in-slot portion 23a of the same conductor segment 23 disposed in a second one of the slots 25 that is one pole-pitch spaced apart from the first one of the slots 25. For example, as shown in FIG. 4, an in-slot portion 231a (one of the in-slot portions 23a) of a first conductor segment 23 disposed in the radially innermost layer of a left slot 25 is paired with another in-slot portion 231b (one of the in-slot portions 23a) of the first conductor segment disposed in the radially outermost layer of a right slot that is one pole-pitch spaced apart from the left slot 25 in the clockwise direction. In the same manner, an in-slot portion 232a (one of the in-slot portions 23a) of a second conductor segment disposed in the radially inner middle layer of the left slot 25 is paired with an in-slot portion 232b (one of the in-slot portions 23a) of the second conductor segment disposed in the radially outer middle layer of the right slot 25.

Accordingly, a turn portion 231c (one of the turn portions 23d) of the first conductor segment encloses a turn portion 232c (one of the turn portions 23d) of the second conductor segment, as shown in FIGS. 3 and 5. The turn portion 231c forms a middle layer coil end, and the turn portion 232c forms an outer layer coil end at an axial end of the stator core 22.

On the other hand, the in-slot portion 232a disposed in the inner middle layer of one of the slots 25 is connected via connection ends 232d, 231d' (which correspond to 23f) to an in-slot portion 231a' disposed in the innermost layer of another slot 25 that is one pole-pitch spaced apart from the one of the slots 25. In the same manner, an in-slot portion 231b' disposed in the outermost layer of one of the slots 25 is connected via connection ends 231e', 232e to the in-slot portion 232b that is disposed in the outer middle layer of the slot 25, which is one pole-pitch spaced apart from the former slot 25.

Accordingly, the connection portions 23c that include the connection ends 232d, 231d' for connecting the in-slot portions 232a, 231a' disposed in the outer middle and the outermost layers and the connection portions 23c that include the connection ends 231e', 232e for connecting the in-slot portions 231b', 232b disposed in the innermost and inner middle layers are shifted from each other in the circumferential direction and disposed at the other axial end of the stator core 22. Thus, inner connection portions 23c that include the connection ends 232d, 231d' and outer connection portions that include the connection ends 231e' and 232e form double coaxial rings of coil-end layers. Incidentally, the outer and inner connection portions 23c are coated by insulation film.

As shown in FIG. 3, a larger U-shaped conductor segment 231 is provided with the in-slot portion 231a disposed in the innermost layer and the in-slot portion 231b disposed in the outermost layer, and a smaller U-shaped conductor segments 232 is provided with the in-slot portion 232a disposed in the inner middle layer and the in-slot portion 232b disposed in the outer middle layer. One of the larger U-shaped segments 231 and one of the smaller U-shaped conductor segments form a basic pair of U-shaped conductor segments 23. The above described arrangement is repeated at all the slots 25 of each stator core 22.

The stator winding 21 is comprised of three phase windings, each of which is a two-turn coil formed of a plurality of the basic pairs of U-shaped conductor segments 23 to be circumferentially mounted in the stator core 22. Each phase-winding has different segments for an output terminal and a terminal to be connected to the neutral point of a star-connected stator winding besides the basic pair of U-shaped segments 23. However, such different segments also have the in-slot portion and other portions that have the same cross-sections as the basic pair of U-shaped conductor segments 23.

Figure 6:
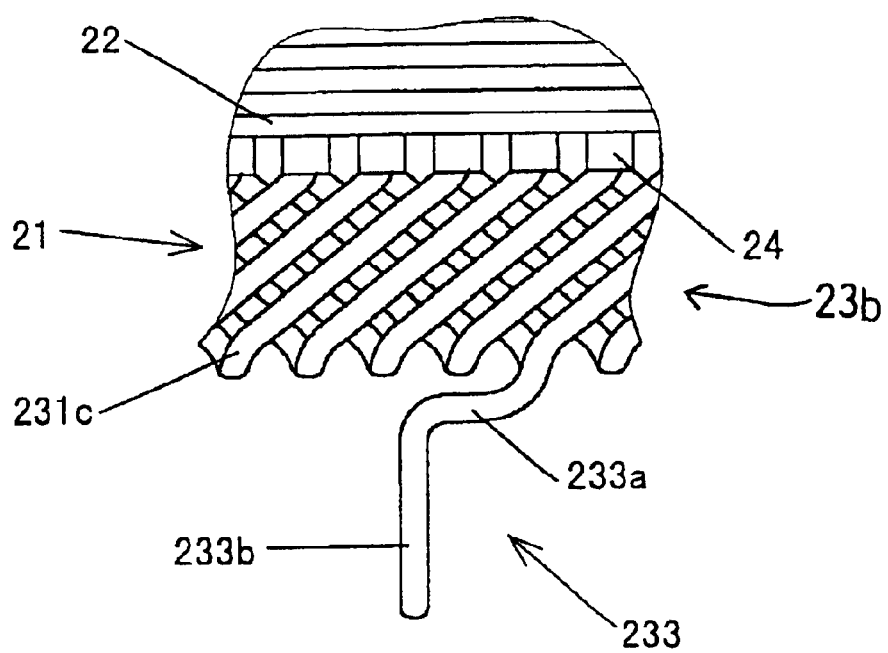
FIG. 6 is a fragmentary side view illustrating an output lead wire extending from one of the coil ends.

As shown in FIG. 6, an output terminal wire 233 to be connected to the rectifier unit 5 is extended from one of the turn portions 23b of the stator winding 21. The output terminal wire 233 is formed by bending the turn portion of one of the U-shaped conductor segments. The output terminal wire 233 has a circumferentially extending lead portion 233a (formed by a first bending) and a straight connection portion 233b (formed by a second bending) by which the terminal wire 233 is connected to the rectifier unit 5. The vehicle ac generator according to the preferred embodiment of the invention has a three-phase stator winding and, therefore, three output terminal wires 233 extended from the turn portions 23b.

Figure 7:
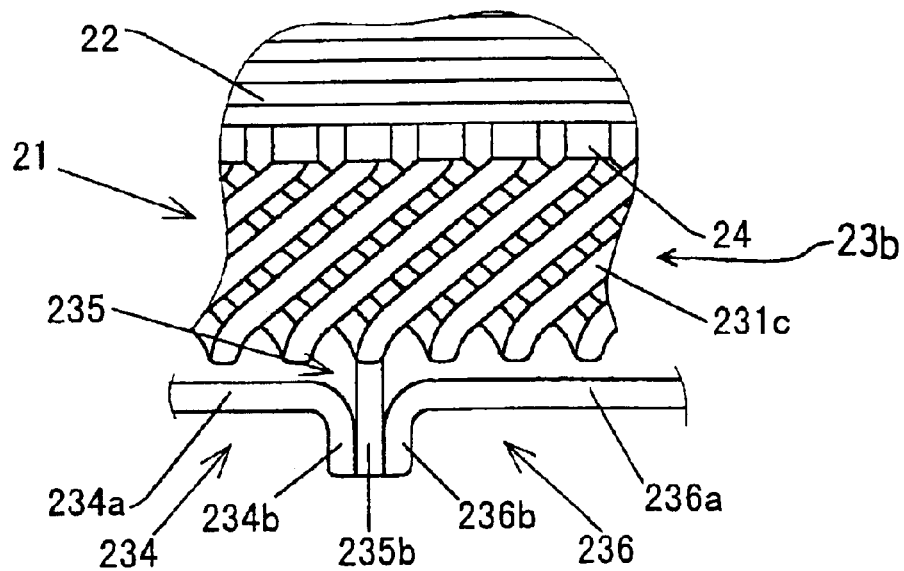
FIG. 7 is a fragmentary side view illustrating neutral lead wires extending from one of the coil ends.

As shown in FIG. 7, three neutral lead wires 234, 235, 236 are extended from respective ends of the three phase-windings of the stator winding 21 that are disposed at the turn portions 23b to connected together. The neutral lead wire 235 has a connection portion 235b that extends straight in the axial direction of the stator. On the other hand, the neutral lead wires 234, 236 respectively have circumferentially extending lead portion 234a, 236a and straight connection portions 234b, 236b that are bent to extend along the connection portion 235b. The connection portions 234b, 236 are welded to the connection portion 235b by a welder to form the neutral point of the star-connected three-phase stator winding 21.

The neutral lead wires 234, 235, 236 maintains a round cross-section of an original wire.

A method of manufacturing the stator winding 21 will be described below.

Figure 8:
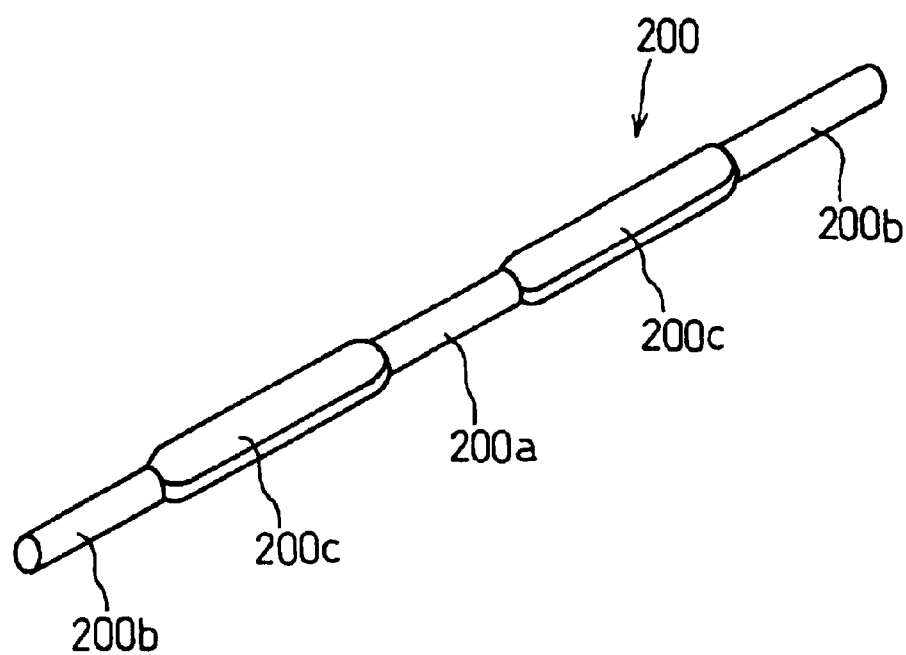
FIG. 8 is a perspective view of a wire material for one of the conductor segments.

At first, an round wire covered with insulating film is cut to form straight segments 200 of two different lengths for larger U-shaped segments 231 and smaller U-shaped segments 232. Then, each straight segment is pressed at two portions 200c that correspond to a pair of the in-slot portions 23a to have an approximately rectangular cross-section and an original round cross-section at a portion 200a that corresponds to the turn portion 23c and portions 200b, 200b that correspond to the connection portions, as shown in FIG. 8. Then the straight segments 200 are bent at the center thereof to form the U-shaped conductor segments 231 or 232.

Because only the in-slot portions 23a are pressed, the insulation film that covers all the portions of conductor segments outside the slots 25 are not deformed or damaged. Because each segment 200 is pressed, uniform and accurate rectangular cross section of the in-slot portion 23a can be made. Because the cross-section of the connection portions 23c is round, it is easy to bend, so that the inclined portion 23e and the connection end 23f can be formed accurately. Although the cross-section of the in-slot portions 23a decreases, other portions of the conductor segments remain unchanged. Accordingly, the resistance of the conductor segments does not increase significantly.

The stator winding 21 can be connected otherwise. For example, a delta connection or a zigzag connection can be also applicable. The above-described invention is also applicable to a multi-phase stator winding that includes a special segment having a pair of in-slot portions inserted into two slots that are spaced apart at a pitch other than 30 degree-pitch.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A stator of a vehicle ac generator, comprising:
   a stator core having a plurality of slots, each of said slots having a rectangular cross-section; and
   a stator winding formed of a plurality of U-shaped conductor segments each of which is made of a round wire, each of said U-shaped conductor segments having a U-shaped turn portion disposed outside said slots at an end of said stator core, a pair of in-slot portions extending from said turn portion and disposed in a pair of said slots and a pair of connection portions respectively welded to connection portions of other two U-shaped conductor segments, only said in-slot portions having a press-formed approximately rectangular cross section fitted to said slots,
   wherein said in-slot portions are provided by pressing preset two portions of each of the round wires.

2. The stator as claimed in claim 1, wherein each of said end portions comprises an inclined portion and a connection end that are bent at portions other than said in-slot portions.

3. The stator as claimed in claim 1, wherein the U-shaped conductor segments are made of primarily round cross section wires covered with insulation film, and the in-slot portions are pressed separately each other.

4. The stator as claimed in claim 1, wherein
   the U-shaped conductor segments are covered with insulation film,
   the in-slot portion has deformed conductive material and deformed insulation film thereon, which are deformed in cross sectional directions, and is placed into the slot without deformation in any bending directions, and
   the U-shaped turn portion and the connection portion have deformed conductive material and deformed insulation film thereon, which are deformed only in bending directions.

5. A stator of a vehicle ac generator, comprising:
   a stator core having a plurality of slots, each of said slots having a rectangular cross-section; and
   a stator winding formed of a plurality of U-shaped conductor segments is made of a round wire, each of the said U-shaped conductor segments having a U-shaped turn portion disposed outside said slots at an end of said stator core, a pair of in-slot portions extending from said turn portion and disposed in a pair of said slots and a pair of connection portions respectively welded to connection portions of other two U-shaped conductor segments, only said in-slot portions having a press-formed approximately rectangular cross section fitted to said slots,
   wherein said stator winding has at least three round output lead wires integrated with those of said U-shaped conductor segments to be connected to a rectifier unit and at least three round neutral lead wires integrated with those of said U-shaped conductor segments to be connected together.

6. A method for manufacturing a stator, the method comprising the steps of:
   preparing a stator core having a plurality of slots and primarily round cross section wires covered with insulation film, each of the wires corresponding to conductor segments to be connected to provide a stator coil;
   forming U-shaped conductor segments by processing the wires, and
   assembling the U-shaped conductor segments on the stator core by placing in-slot portions of the U-shaped conductor segments in the slots and welding connection portions of the U-shaped conductor segments to form the stator coil, wherein
   each of the U-shaped conductor segments having a pair of in-slot portions, a U-shaped turn portion integrally formed with the in-slot portions to connect them, and a pair of connection portions each integrally formed with the in-slot portions on the other side of the U-shaped turn portion, wherein the in-slot portion is formed by deforming conductive material of the wire and the insulation film thereon in cross sectional directions into an approximately rectangular shape before the in-slot portion is stacked with other in-slot portion to be placed in the same slot and is placed in the slot without deformation in any bending direction, and the U-shaped turn portion and the connection portions are formed by deforming the conductive material of the wire and the insulation film thereon only in bending directions while maintaining original round cross section of the wire.

7. The method claimed in claim 6, wherein the in-slot portion is formed while the wire is straight, and the forming process of the U-shaped turn portion and the connection portions is performed after the deforming process on the in-slot portion is completed and is performed while maintaining the in-slot portion straight.

* * * * *